US012421976B1

(12) United States Patent
Robertson

(10) Patent No.: US 12,421,976 B1
(45) Date of Patent: Sep. 23, 2025

(54) ROOT BLOCK DESIGN FOR COMPOSITE FAN BLADE

(71) Applicant: RTX Corporation, Farmington, CT (US)

(72) Inventor: Thomas Robertson, Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/738,716

(22) Filed: Jun. 10, 2024

(51) Int. Cl.
*F04D 29/38* (2006.01)
*F04D 29/02* (2006.01)

(52) U.S. Cl.
CPC ......... *F04D 29/388* (2013.01); *F04D 29/023* (2013.01); *F05D 2220/36* (2013.01); *F05D 2240/307* (2013.01)

(58) Field of Classification Search
CPC ........... F04D 29/388; F01D 5/14; F01D 5/147
See application file for complete search history.

(56) References Cited

U.S. PATENT DOCUMENTS

| | | | | |
|---|---|---|---|---|
| 3,942,231 | A * | 3/1976 | Whitaker | C22C 47/20 416/241 A |
| 9,376,916 | B2 * | 6/2016 | McCaffrey | F01D 5/147 |
| 9,828,861 | B2 | 11/2017 | Le Hong | |
| 10,060,277 | B2 | 8/2018 | Engel et al. | |
| 10,577,951 | B2 | 3/2020 | Vetters et al. | |
| 10,767,496 | B2 | 9/2020 | Freeman et al. | |
| 2019/0301290 | A1 * | 10/2019 | Kamiya | B29C 70/70 |

* cited by examiner

*Primary Examiner* — Courtney D Heinle
*Assistant Examiner* — John S Hunter, Jr.
(74) *Attorney, Agent, or Firm* — Bachman & LaPointe, P.C.

(57) ABSTRACT

A root block design for a composite fan blade including first side plies attached to second side plies to form the composite fan blade, the composite fan blade comprising a blade tip opposite a root portion; a first wedge in operative communication with the first side plies proximate the root portion; and a second wedge in operative communication with the second side plies proximate the root portion; wherein each of the first wedge and the second wedge are configured insertable within a dovetail of a blade hub configured to support the composite fan blade.

20 Claims, 5 Drawing Sheets

ROOT BLOCK DESIGN FOR COMPOSITE FAN BLADE

BACKGROUND

The present disclosure is directed to the improved root block design for a composite fan blade.

Composite fan blades are critical enabling technology for future commercial programs. One of the challenges in fabricating a composite fan blade is the transition from a very thick blade root to a much thinner airfoil. Variation in this area will lead to poor laminate quality and subsequently poor physical performance.

Additional consideration in root design is the ability to demonstrate a consistent failure location ("prime reliable" failure mode), which enables alternative reduced fan blade off certification requirements and enables more efficient engine architecture.

SUMMARY

In accordance with the present disclosure, there is provided a root block design for a composite fan blade comprising first side plies attached to second side plies to form the composite fan blade, the composite fan blade comprising a blade tip opposite a root portion; a first wedge in operative communication with the first side plies proximate the root portion; and a second wedge in operative communication with the second side plies proximate the root portion; wherein each of the first wedge and the second wedge are configured insertable within a dovetail of a blade hub configured to support the composite fan blade.

A further embodiment of any of the foregoing embodiments may additionally and/or alternatively include both of the first wedge and the second wedge are configured to create a thickened portion pressed against the first side plies attached to the second side plies to secure the composite fan blade within the blade hub.

A further embodiment of any of the foregoing embodiments may additionally and/or alternatively include each of the first wedge and the second wedge contacts the root portion along a transition region radius.

A further embodiment of any of the foregoing embodiments may additionally and/or alternatively include each of the first wedge and the second wedge contact the root portion along an axial portion.

A further embodiment of any of the foregoing embodiments may additionally and/or alternatively include each of the first wedge and the second wedge contact the root portion along a radial portion for a predetermined distance of an airfoil portion of the composite fan blade.

A further embodiment of any of the foregoing embodiments may additionally and/or alternatively include the root block design for a composite fan blade further comprising at least one fastener coupling the first wedge and the second wedge with the first side plies and the second side plies.

A further embodiment of any of the foregoing embodiments may additionally and/or alternatively include the root block design for a composite fan blade further comprising a root cap in operative communication with a base end of the composite fan blade proximate the root portion; a root delta located between the root cap and the base end proximate a transition region radius of the root portion; and a spacer inserted between the root cap and a hub dovetail.

In accordance with the present disclosure, there is provided a composite fan blade comprising first side plies attached to second side plies to form the composite fan blade, the composite fan blade comprising a blade tip opposite a root portion; the root portion includes a transition region radius where an axial portion transitions to a radial portion of the polymer matrix composite material blade; an airfoil portion located between the blade tip and the root portion; a first wedge in operative communication with the first side plies proximate the root portion; and a second wedge in operative communication with the second side plies proximate the root portion; wherein each of the first wedge and the second wedge are configured insertable within a dovetail of a blade hub configured to support the composite fan blade.

A further embodiment of any of the foregoing embodiments may additionally and/or alternatively include each of the first wedge and the second wedge includes a blade face configured to contact the first side plies and the second side plies respectively; the first wedge and the second wedge includes a hub face configured to contact the blade hub; the blade face shaped to align with contours of the first side plies and the second side plies proximate the root portion; and the hub face shaped to align with contours of the dovetail of the blade hub.

A further embodiment of any of the foregoing embodiments may additionally and/or alternatively include the composite fan blade further comprising at least one fastener coupling the first wedge and the second wedge with the first side plies and the second side plies respectively; wherein the at least one fastener being installed into a pocket formed in the hub face of the first wedge and a pocket formed in the hub face of the second wedge; and a bore formed in each of the first wedge, the first side plies, the second side plies and the second wedge; the bore configured to support the at least one fastener.

A further embodiment of any of the foregoing embodiments may additionally and/or alternatively include the composite fan blade further comprising a first platform attached to the first wedge and the first side plies with the at least one fastener; a second platform attached to the second wedge and the second side plies with the at least one fastener.

A further embodiment of any of the foregoing embodiments may additionally and/or alternatively include each of the first wedge and the second wedge contacts the root portion along the transition region radius; wherein each of the first wedge and the second wedge contact the root portion along the axial portion; wherein each of the first wedge and the second wedge contact the root portion along the radial portion for a predetermined distance along the airfoil portion of the composite fan blade.

A further embodiment of any of the foregoing embodiments may additionally and/or alternatively include the composite fan blade further comprising a root cap in operative communication with a base end of the composite fan blade proximate the root portion; a root delta located between the root cap and the base end proximate the transition region radius of the root portion; and a spacer inserted between the root cap and a hub dovetail.

In accordance with the present disclosure, there is provided a process for securing a composite fan blade with a root block design comprising attaching first side plies to second side plies to form the composite fan blade, the composite fan blade comprising a blade tip opposite a root portion; the root portion includes a transition region radius where an axial portion transitions to a radial portion of the polymer matrix composite material blade; an airfoil portion located between the blade tip and the root portion; coupling a first wedge in operative communication with the first side plies proximate the root portion; and coupling a second wedge in operative communication with the second side plies proximate the root portion; configuring each of the first wedge and the second wedge insertable within a dovetail of a blade hub configured to support the composite fan blade.

A further embodiment of any of the foregoing embodiments may additionally and/or alternatively include the process further comprising configuring both the first wedge and the second wedge to create a thickened portion pressed against the first side plies attached to the second side plies to secure the composite fan blade within the blade hub.

A further embodiment of any of the foregoing embodiments may additionally and/or alternatively include the process further comprising configuring a blade face of the first wedge to contact the first side plies; configuring a blade face of the second wedge to contact the second side plies; configuring a hub face of the first wedge to contact the blade hub; configuring a hub face of the second wedge to contact the blade hub; shaping the blade face of the first wedge to align with contours of the first side plies proximate the root portion; shaping the blade face of the second wedge to align with contours of the second side plies proximate the root portion; shaping the hub face of the first wedge to align with contours of the dovetail of the blade hub; and shaping the hub face of the second wedge to align with contours of the dovetail of the blade hub.

A further embodiment of any of the foregoing embodiments may additionally and/or alternatively include the process further comprising coupling the first wedge with the first side plies and the second wedge with the second side plies employing at least one fastener; installing the at least one fastener into a pocket formed in the hub face of the first wedge and a pocket formed in the hub face of the second wedge; forming a bore in each of the first wedge, the first side plies, the second side plies and the second wedge; and configuring the bore to support the at least one fastener.

A further embodiment of any of the foregoing embodiments may additionally and/or alternatively include the process further comprising attaching a first platform to the first wedge and the first side plies with the at least one fastener; and attaching a second platform to the second wedge and the second side plies with the at least one fastener.

A further embodiment of any of the foregoing embodiments may additionally and/or alternatively include the process further comprising contacting each of the first wedge and the second wedge with the root portion along the transition region radius; contacting each of the first wedge and the second wedge with the root portion along the axial portion; and contacting each of the first wedge and the second wedge with the root portion along the radial portion for a predetermined distance along the airfoil portion of the composite fan blade.

A further embodiment of any of the foregoing embodiments may additionally and/or alternatively include the process further comprising coupling a root cap in operative communication with a base end of the composite fan blade proximate the root portion; locating a root delta between the root cap and the base end proximate the transition region radius of the root portion; and inserting a spacer between the root cap and a hub dovetail.

Other details of the root block design for a composite fan blade are set forth in the following detailed description and the accompanying drawings wherein like reference numerals depict like elements.

DETAILED DESCRIPTION

Figure 1:
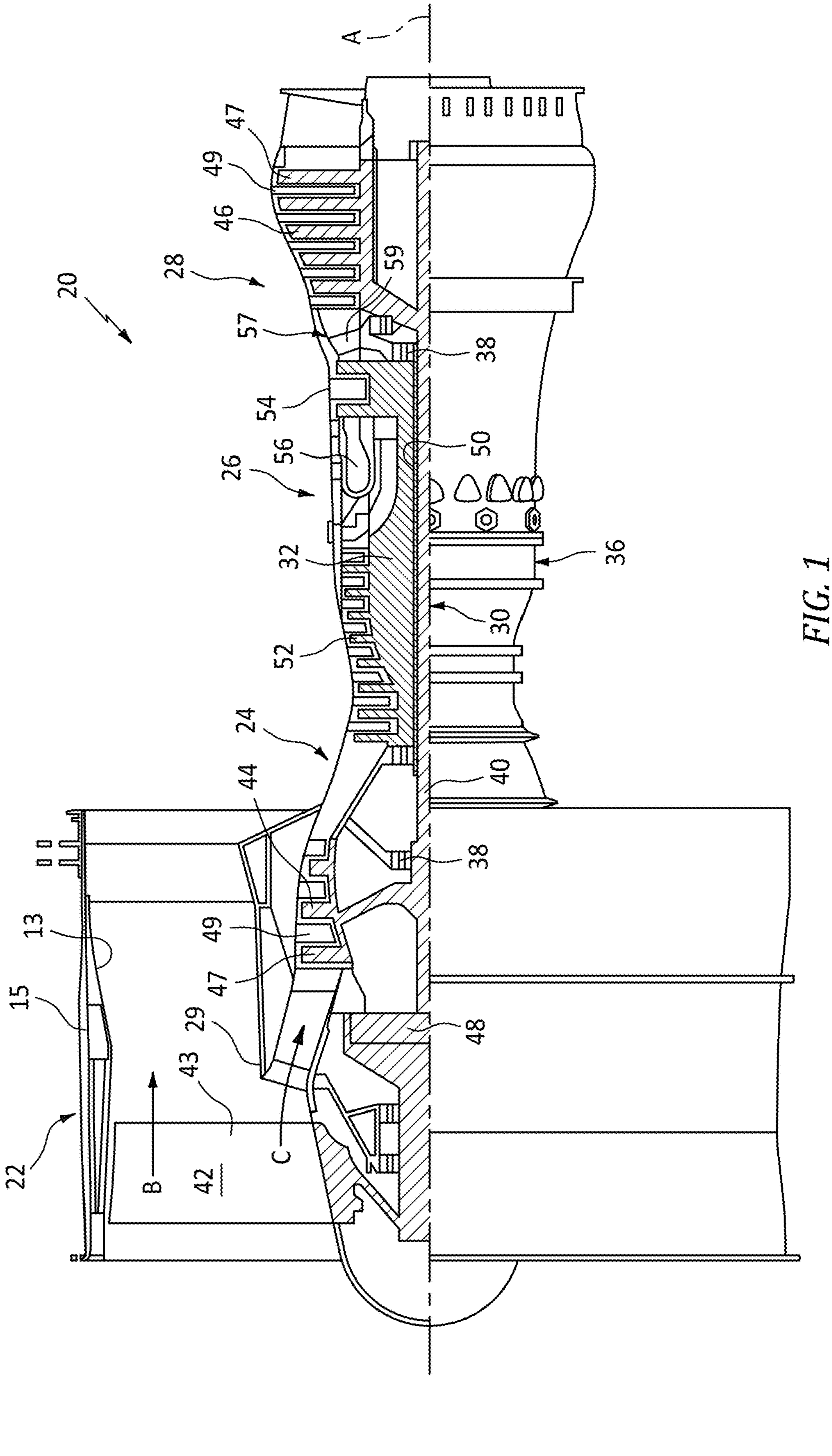
FIG. 1 is a cross section view of an exemplary gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The low pressure compressor 44, high pressure compressor 52, high pressure turbine 54 and low pressure turbine 46 each include one or more stages having a row of rotatable airfoils. Each stage may include a row of static vanes adjacent the rotatable airfoils. The rotatable airfoils and vanes are schematically indicated at 47 and 49.

Figure 2:
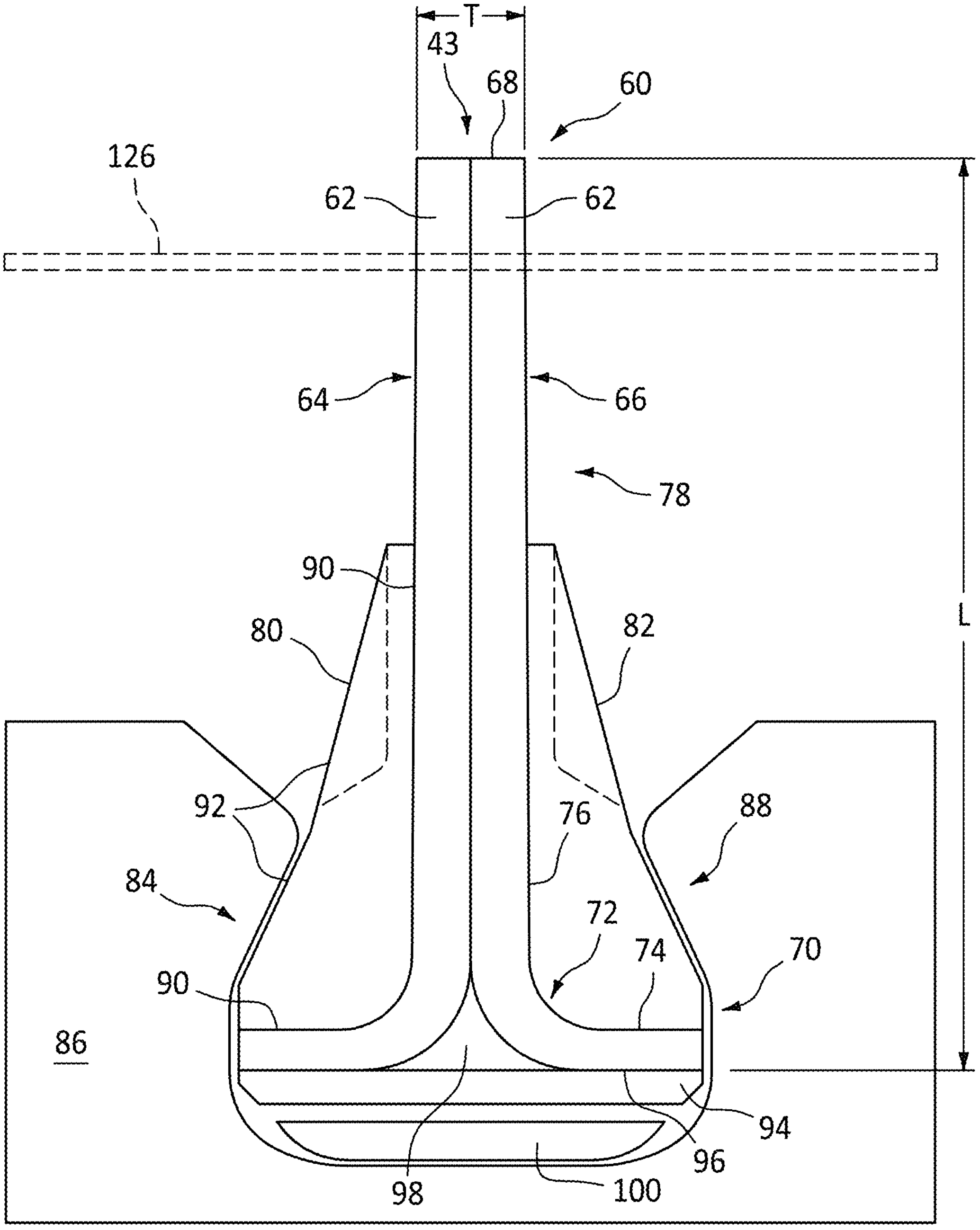
FIG. 2 is a schematic representation of an exemplary composite fan blade.

Referring also to FIG. 2 an exemplary polymer matrix composite material component 60. The polymer matrix composite material component 60 can be a fan blade 43. The polymer matrix composites are materials made up of fibers that are embedded in an organic polymer matrix. These fibers are introduced to enhance selected properties of the material. Polymers are reinforced with fibers which can be continuous single or chopped multi-filaments that are woven into cloth and other types of preformed textiles or unidirectional tape. These fibers can be impregnated into the matrix polymer in liquid form by injection, extrusion, pressing or stamping and then cured to produce the final composite. The polymer matrix composite material component 60 can include layers 62. The layers 62 can overlap and stack as needed to maximize overall properties of the component.

The polymer matrix composite material component blade 43 can include a first side of plies 64, such as a suction side (SS) and a second side of plies 66, such as a pressure side opposite the first side of plies 64. The first side of plies 64 and the second side of plies 66 can be combined to make up the fan blade 43. The polymer matrix composite material component 60 can include a span length L dimension extending from a blade tip 68 to a root portion 70. The polymer matrix composite material component 60 can include a thickness T dimension which can equate to the blade 43 cross sectional thickness.

The root portion 70 of the polymer matrix composite material component 60 can extend axially a predetermined dimension and include a transition region radius 72 where an axial portion 74 of the polymer matrix composite material component transitions to a radial portion 76 of the polymer matrix composite material component 60. An airfoil portion 78 of the blade 43 is located between the blade tip 68 and the root portion 70.

A first wedge 80, such as a suction side wedge (SS wedge) can be in operative communication with the first side plies 64 proximate the root portion 70. A second wedge 82, such as a pressure side wedge (PS wedge) can be in operative communication with the second side plies 66 proximate the root portion 70. Each of the first wedge 80 and second wedge 82 can be placed on opposite sides of the polymer matrix composite material component 60 as well as within a dovetail 84 of a blade hub 86 configured to support the fan blade 43. The wedges 80, 82 are configured to create a thickened portion 88 that can press against the polymer matrix composite material component 60 to secure the blade 43 within the blade hub 86. The wedges 80, 82, can contact the root portion 70 along the transition region radius 72. The wedges 80, 82, can contact the root portion 70 along the axial portion 74. The wedges 80, 82, can contact the root portion 70 along the radial portion 76 for a predetermined distance of the airfoil 78.

The wedges 80, 82, can include a blade face 90 configured to contact the plies 64, 66 of the blade 43. The wedges 80, 82 can include a hub face 92 configured to contact the blade hub 86. As seen in FIG. 2 to FIG. 5 the blade face 90 of the wedges 80, 82 is shaped to follow the contours of the plies 64, 66 proximate the root portion 70. The hub faces 92 are configured to follow the contours of the dovetail 84 of the blade hub 86. During engine operation centrifugal loading drives the wedges 80, 82 into contact with the hub 86, such that the wedges 80, 82 act as a vise clamping the plies 64, 66 together. The wedges 80, 82 can be constructed from preform block materials of composite material or metal material.

A root cap 94 can be in operative communication with a base end 96 of the polymer matrix composite material component 60 proximate the root portion 70. The root cap 94 can be employed to protect the plies 64, 66 at the base end 96 of the polymer matrix composite material component 60 from wear against the blade hub 86. The root cap 94 can be constructed from polymer matrix composite material.

A root gap fill or simply root delta 98 can be employed between the root cap 94 and the polymer matrix composite material component base end 96 proximate the transition region radius 72 to fill the void between the root cap 94 and the base end 96. The root delta 98 can be constructed from filler materials, such as foam. The root cap 94 and root delta 98 are configured to prevent windmilling damage to the polymer matrix composite material component 60.

A spacer 100 can be employed inserted between the root cap 94 and the hub dovetail 84. The spacer 100 can fill the space that remains between the root cap and the hub 86 depending on the particular fan blade 43 and fan hub 86 design. The spacer 100 can be constructed from moldable materials, such as polymeric or metallic materials depending on cost and weight considerations.

Figure 3:
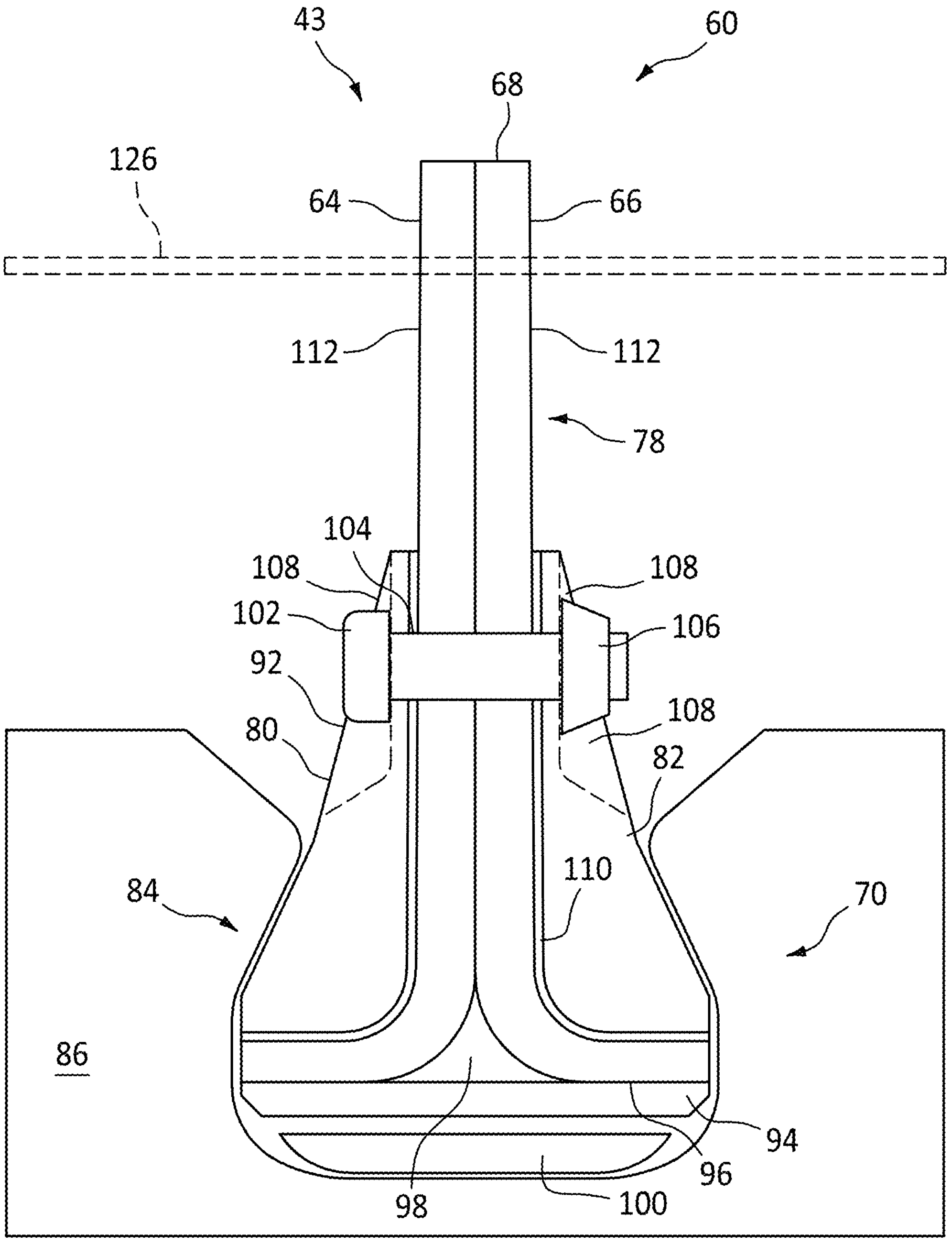
FIG. 3 is a schematic representation of an exemplary composite fan blade.

Referring also to FIG. 3, polymer matrix composite material component 60 can include at least one fastener 102 coupling the wedges 80, 82 with the plies 64, 66. As seen in FIG. 3, the fastener 102 is inserted through a bore 104 formed in each of the first wedge 80, first side plies 64, second side plies 66 and second wedge 82. The fastener 102 can be configured as a threaded fastener with a locking nut 106 in an exemplary embodiment. The fastener 102 can be installed into pockets 108 formed in the hub face 92 of each wedge 80, 82. The pocket 108 allows for a lower profile for the fastener 102 as well as providing parallel faces for the bolt stack of the fastener 102. The wedges 80, 82 can be attached to the respective plies 64, 66 by use of adhesive/weld materials 110. The blade face 90 of the wedges 80, 82 can be bonded to the exteriors 112 of the plies 64, 66. Employment of the fastener 102 can create redundant load paths in the polymer matrix composite material component 60. The use of the fastener(s) 102 can impart a clamping load on the polymer matrix composite material component 60 through the wedges 80, 82. The fastener(s) 102 can impart a mechanical locking of wrap-around plies (not shown). The fastener(s) 102 can provide a redundant shear capability retaining the root portion 70 together.

Figure 4:
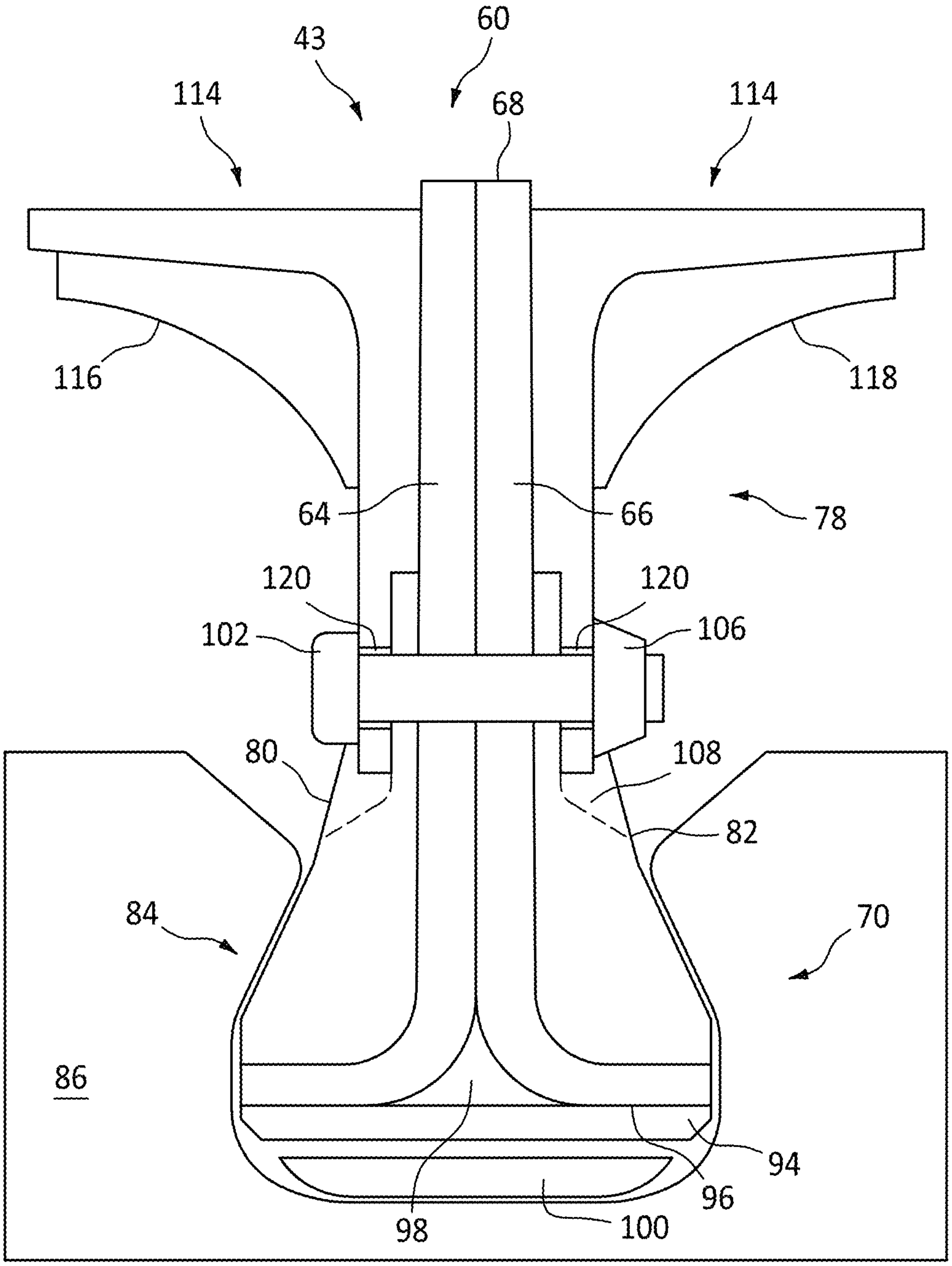
FIG. 4 is a schematic representation of an exemplary composite fan blade.
Figure 5:
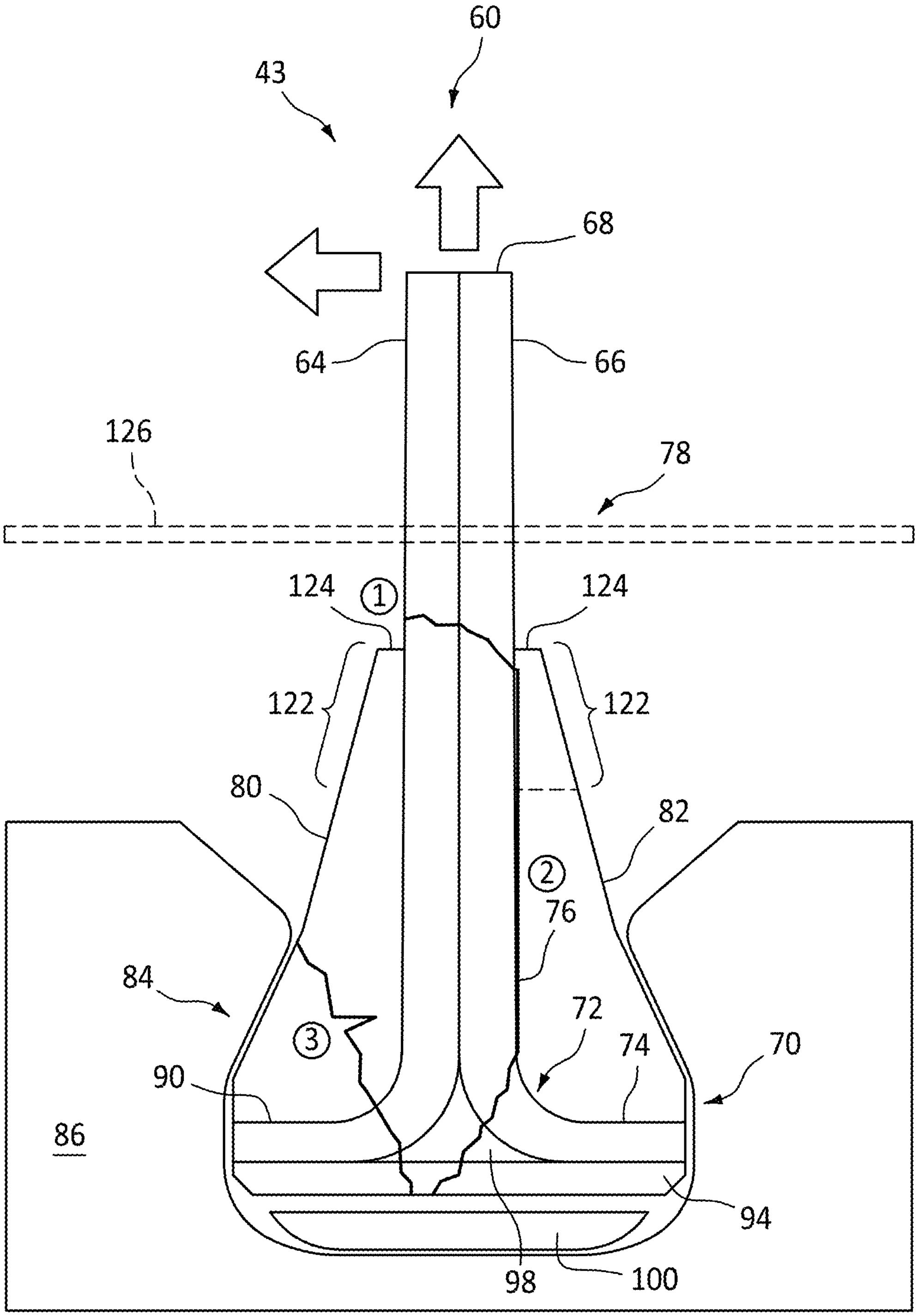
FIG. 5 is a schematic representation of an exemplary composite fan blade diagram.

Referring also to FIG. 4, the fastener(s) 102 can be employed with connecting platforms 114. A first platform 116 (suction side) and a second platform 118 (pressure side) can be installed with the polymer matrix composite material component 60. The first platform 116 can be attached to the first wedge 80 as well as the first side plies exterior 112 with the fastener 102. The second platform 118 can be attached to the second wedge 82 as well as the second side plies exterior 112 with the fastener 102. The platforms 114 can be adhered to the plies 64, 66 with adhesive. The fastener 102 simplifies the hub geometry and allows for backwards compatibility with existing integral platform blade configurations. In an exemplary embodiment the platforms 114 can be constructed from compression molded long fiber composite materials to save weight. The bore 104 can extend through the platforms 114 as well as the wedges 80,82 and plies 64, 66. Bushings/compression sleeves 120 can be incorporated in the assembly along with the fastener 102.

It is contemplated that the wedges 80, 82 include a stiffness transition zone 122 be incorporated into each of the wedges 80, 82 proximate the radial ends 124 of the wedges 80, 82. The stiffness transition zone 122 can provide for a gradual change in structural stiffness in the wedges 80,82 to allow for flexibility/deflection to take place during blade 43 operation to prevent delamination and ply failure in the plies 64, 66 proximate the radial ends 124.

The inherent wedge 80, 82 shape mechanically traps the root portion 70 of the polymer matrix composite material component 60 into the hub 86. The likelihood of an intra-laminar shear failure is low due to the mechanical advantage provided by the wedges 80, 82 if the bond between the blade face 90 and exterior 112 takes place.

The currently disclosed design accounts for an extreme impact event, in which the disbond of the wedge near the flowpath 126 will off-load strains without allowing the root 70 to pull out of the dovetail 84.

A technical advantage of the disclosed root block design for a composite fan blade includes simplifying the fabrication of the composite airfoil by creating a more uniform thickness transition from root to airfoil.

Another technical advantage of the disclosed root block design for a composite fan blade includes speeding up processing time.

Another technical advantage of the disclosed root block design for a composite fan blade includes reducing material waste in root machining.

Another technical advantage of the disclosed root block design for a composite fan blade includes allowing for root laminate inspection prior to bond.

Another technical advantage of the disclosed root block design for a composite fan blade includes lower overall product cost.

There has been provided a root block design for a composite fan blade. While the root block design for a composite fan blade has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A root block design for a composite fan blade comprising:

first side plies attached to second side plies to form the composite fan blade, the composite fan blade comprising a blade tip opposite a root portion;

a first wedge in operative communication with the first side plies proximate the root portion; and a second wedge in operative communication with the second side plies proximate the root portion; wherein each of the first wedge and the second wedge are configured to be insertable within a dovetail of a blade hub configured to support the composite fan blade;

a root cap in operative communication with a base end of the composite fan blade proximate the root portion;

a root delta located between the root cap and the base end proximate a transition region radius of the root portion; and a spacer filling a space that remains between the root cap and a hub dovetail.

2. The root block design for a composite fan blade according to claim 1, wherein both of the first wedge and the second wedge being configured to create a thickened portion pressed against the first side plies attached to the second side plies to secure the composite fan blade within the blade hub.

3. The root block design for a composite fan blade according to claim 1, wherein each of the first wedge and the second wedge contacts the root portion along a transition region radius.

4. The root block design for a composite fan blade according to claim 1, wherein each of the first wedge and the second wedge contact the root portion along an axial portion.

5. The root block design for a composite fan blade according to claim 1, wherein each of the first wedge and the second wedge contact the root portion along a radial portion for a predetermined distance of an airfoil portion of the composite fan blade.

6. The root block design for a composite fan blade according to claim 1, further comprising:

at least one fastener coupling the first wedge and the second wedge with the first side plies and the second side plies.

7. The root block design for a composite fan blade according to claim 1, further comprising:

a root delta located between the root cap and the base end proximate a transition region radius of the root portion.

8. A composite fan blade comprising:

first side plies attached to second side plies to form the composite fan blade, the composite fan blade comprising a blade tip opposite a root portion; the root portion includes a transition region radius where an axial portion transitions to a radial portion of the polymer matrix composite material blade;

an airfoil portion located between the blade tip and the root portion;

a first wedge in operative communication with the first side plies proximate the root portion; and a second wedge in operative communication with the second side plies proximate the root portion; wherein each of the first wedge and the second wedge are configured to be insertable within a dovetail of a blade hub configured to support the composite fan blade;

a root cap in operative communication with a base end of the composite fan blade proximate the root portion; and a spacer filling a space that remains between the root cap and a hub dovetail.

9. The composite fan blade according to claim 8, wherein each of the first wedge and the second wedge includes a blade face configured to contact the first side plies and the second side plies respectively;

the first wedge and the second wedge includes a hub face configured to contact the blade hub;

the blade face shaped to align with contours of the first side plies and the second side plies proximate the root portion; and the hub face shaped to align with contours of the dovetail of the blade hub.

10. The composite fan blade according to claim 8, further comprising:

at least one fastener coupling the first wedge and the second wedge with the first side plies and the second side plies respectively; wherein the at least one fastener being installed into a pocket formed in the hub face of the first wedge and a pocket formed in the hub face of the second wedge; and a bore formed in each of the first wedge, the first side plies, the second side plies and the second wedge; the bore configured to support the at least one fastener.

11. The composite fan blade according to claim 10, further comprising:

a first platform attached to the first wedge and the first side plies with the at least one fastener;

a second platform attached to the second wedge and the second side plies with the at least one fastener.

12. The composite fan blade according to claim 8, wherein each of the first wedge and the second wedge contacts the root portion along the transition region radius; wherein each of the first wedge and the second wedge contact the root portion along the axial portion; wherein each of the first wedge and the second wedge contact the root portion along the radial portion for a predetermined distance along the airfoil portion of the composite fan blade.

13. The composite fan blade according to claim 8, further comprising:

a root delta located between the root cap and the base end proximate the transition region radius of the root portion.

14. A process for securing a composite fan blade with a root block design comprising:

attaching first side plies to second side plies to form the composite fan blade, the composite fan blade comprising a blade tip opposite a root portion; the root portion includes a transition region radius where an axial portion transitions to a radial portion of the polymer matrix composite material blade; an airfoil portion located between the blade tip and the root portion;

coupling a first wedge in operative communication with the first side plies proximate the root portion; and coupling a second wedge in operative communication with the second side plies proximate the root portion;

configuring each of the first wedge and the second wedge to be insertable within a dovetail of a blade hub configured to support the composite fan blade;

coupling a root cap in operative communication with a base end of the composite fan blade proximate the root portion;

inserting a spacer between the root cap and a hub dovetail; and filling a space that remains between the root cap and a hub dovetail.

15. The process of claim 14, further comprising:

configuring both the first wedge and the second wedge to create a thickened portion pressed against the first side plies attached to the second side plies to secure the composite fan blade within the blade hub.

16. The process of claim 14, further comprising:

configuring a blade face of the first wedge to contact the first side plies;

configuring a blade face of the second wedge to contact the second side plies;

configuring a hub face of the first wedge to contact the blade hub;

configuring a hub face of the second wedge to contact the blade hub;

shaping the blade face of the first wedge to align with contours of the first side plies proximate the root portion;

shaping the blade face of the second wedge to align with contours of the second side plies proximate the root portion;

shaping the hub face of the first wedge to align with contours of the dovetail of the blade hub; and shaping the hub face of the second wedge to align with contours of the dovetail of the blade hub.

17. The process of claim 14, further comprising:

coupling the first wedge with the first side plies and the second wedge with the second side plies employing at least one fastener;

installing the at least one fastener into a pocket formed in the hub face of the first wedge and a pocket formed in the hub face of the second wedge;

forming a bore in each of the first wedge, the first side plies, the second side plies and the second wedge; and configuring the bore to support the at least one fastener.

18. The process of claim 17, further comprising:

attaching a first platform to the first wedge and the first side plies with the at least one fastener; and attaching a second platform to the second wedge and the second side plies with the at least one fastener.

19. The process of claim 14, further comprising:

contacting each of the first wedge and the second wedge with the root portion along the transition region radius;

contacting each of the first wedge and the second wedge with the root portion along the axial portion; and contacting each of the first wedge and the second wedge with the root portion along the radial portion for a predetermined distance along the airfoil portion of the composite fan blade.

20. The process of claim 14, further comprising:

locating a root delta between the root cap and the base end proximate the transition region radius of the root portion.

* * * * *